(12) United States Patent
Kwon

(10) Patent No.: US 9,022,461 B2
(45) Date of Patent: May 5, 2015

(54) HIGH STIFFNESS WATERPROOF ROOF PANEL PAD FOR VEHICLE AND MANUFACTURING METHOD THEREOF

(71) Applicant: Daehan Solution Co., Ltd, Incheon (KR)

(72) Inventor: Choong Ho Kwon, Seoul (KR)

(73) Assignee: Daehan Solutions Co., Ltd., Incheon (KR)

( * ) Notice: Subject to any disclaimer, the term of this patent is extended or adjusted under 35 U.S.C. 154(b) by 0 days.

(21) Appl. No.: 14/259,319

(22) Filed: Apr. 23, 2014

(65) Prior Publication Data

US 2014/0327275 A1    Nov. 6, 2014

(30) Foreign Application Priority Data

May 3, 2013    (KR) .................. 10-2013-0050071

(51) Int. Cl.
*B60R 13/08* (2006.01)
*B32B 37/14* (2006.01)

(52) U.S. Cl.
CPC ............... *B60R 13/08* (2013.01); *B32B 37/14* (2013.01)

(58) Field of Classification Search
CPC ........................ B60R 13/0212; B60R 13/02
USPC ............... 428/223; 296/214, 203, 37.7, 211; 156/78
IPC ...................................................... B60R 13/08
See application file for complete search history.

(56) References Cited

U.S. PATENT DOCUMENTS

| | | | | |
|---|---|---|---|---|
| 7,309,521 | B2 * | 12/2007 | Brown | 428/223 |
| 7,648,753 | B2 * | 1/2010 | Asbury | 428/141 |
| 7,744,150 | B2 * | 6/2010 | Esteban et al. | 296/214 |
| 7,901,765 | B2 * | 3/2011 | Dolgopolsky et al. | 428/316.6 |
| 2001/0024052 | A1 * | 9/2001 | Takahara | 296/188 |
| 2005/0242607 | A1 * | 11/2005 | Neumann | 296/39.1 |
| 2010/0066121 | A1 * | 3/2010 | Gross | 296/146.5 |
| 2012/0064329 | A1 * | 3/2012 | Balthes et al. | 428/297.4 |

FOREIGN PATENT DOCUMENTS

| | | |
|---|---|---|
| JP | 2007260960 A | 10/2007 |
| JP | 2012061940 A | 3/2012 |
| KR | 10-0802677 B1 | 2/2008 |

* cited by examiner

*Primary Examiner* — Pinel Romain
(74) *Attorney, Agent, or Firm* — Bacon & Thomas, PLLC

(57) ABSTRACT

A high stiffness waterproof roof panel pad for a vehicle, which is configured by stacking and laminating a waterproof reinforcing layer coated with PE layers on both surfaces of a urethane foam pad, thereby reinforcing the stiffness of a vehicle body panel, preventing the pad from becoming wet due to dew condensation and thus increasing noise and vibration reduction effects and having a waterproof function. Additionally, a method of manufacturing the waterproof roof panel pad includes preparing a hard urethane foam pad, preparing a waterproof reinforcing layer of which both surfaces are coated with PE layers, stacking the waterproof reinforcing layer on both surfaces of the urethane foam pad, laminating the PE layer in contact with the urethane foam pad and integrally forming the urethane foam pad and the waterproof reinforcing layer, and performing a cutting operation according to a shape and a size of a roof panel.

1 Claim, 7 Drawing Sheets

HIGH STIFFNESS WATERPROOF ROOF PANEL PAD FOR VEHICLE AND MANUFACTURING METHOD THEREOF

CROSS-REFERENCE TO RELATED APPLICATION

This application claims priority to and the benefit of Korean Patent Application No. KR 10-2013-0050071, filed on May 3, 2013, the disclosure of which is incorporated herein by reference in its entirety.

BACKGROUND

1. Field of the Invention

The present invention relates to a high stiffness waterproof roof panel pad for a vehicle and a manufacturing method thereof, and more particularly, to a high stiffness waterproof roof panel pad for a vehicle, in which a waterproof reinforcing layer having a PE layer is stacked on both surfaces of a urethane foam pad having excellent sound absorption performance, and the urethane foam pad and the waterproof reinforcing layer are formed integrally by laminating the PE layer, and thus it is possible to provide a waterproof function as well as reinforce stiffness, thereby reducing noise and vibration generated and transferred from the roof panel of the vehicle to an inside of the vehicle and also preventing dew condensation, and a manufacturing method thereof.

2. Discussion of Related Art

Generally, in a vehicle, a sound absorbing pad is installed on a vehicle body panel in order to reduce noise or vibration transferred from an outside of the vehicle to an inside thereof and thus to improve ride comfort. The sound absorbing pad needs a complex solution to improvements in fuel efficiency, noise, vibration and the like through a weight of the vehicle.

Accordingly, Patent Document 1 discloses a sound absorbing material having a multilayered structure in which a horizontally arranged sound absorbing material layer and a vertically arranged sound absorbing material are stacked, and a surface-treated non-woven fabric is attached to an outer surface thereof in order to suppress dust generation and also to increase surface uniformity, and a manufacturing method thereof. Here, since the thin surface-treated non-woven fabric is attached to the outer surface so as to perform a finishing process, it is possible to provide the sound absorbing material which may prevent the dust generation at the surface thereof in advance and also increase the surface uniformity. Further, since the sound absorbing material is manufactured so as to have the multilayered structure in which the horizontally arranged sound absorbing material layer which is a high density layer and the vertically arranged sound absorbing material which is a low density layer are mixedly stacked, a difference in surface density occurs between the layers, and it is possible to reduce a weight and further improve performance of the sound absorbing material by the difference in surface density.

As a conventional pad used in a vehicle body panel of a vehicle, a sound absorbing pad in which PET felt is generally used as a base material has been used widely. However, the sound absorbing pad had the following limitations:

(1) In the case of the sound absorbing pad formed of the PET felt, it had sound absorbing ability, but it was not able to reinforce stiffness of the vehicle body. Therefore, it could not reduce noise due to vibration transferred from the vehicle body to the inside of the vehicle.

(2) Further, in winter when a difference in temperature between the inside of the vehicle and the outside thereof was great, dew condensation was generated at an inner side of the vehicle body panel. If the sound absorbing pad was wet due to the dew condensation, then the sound absorbing effect was deteriorated, and the sound absorbing pad could become separated from the vehicle body panel.

CONVENTIONAL TECHNICAL DOCUMENT

Patent document (Patent Document 1) Korean Patent No. 0802677 (registration date: Feb. 1, 2008)

SUMMARY OF THE INVENTION

The present invention is directed to a high stiffness waterproof roof panel pad for a vehicle, in which a pad is formed by stacking a waterproof reinforcing layer coated with a PE layer on both surfaces of a urethane foam pad and then performing a laminating process, and thus it is possible to prevent the pad from becoming wet due to dew condensation as well as reinforce stiffness of a vehicle panel, thereby reducing noise and vibration and also providing a waterproof function, and a manufacturing method thereof.

According to an aspect of the present invention, there is provided a method of manufacturing a high stiffness waterproof roof panel pad for a vehicle, including preparing a hard urethane foam pad (10), preparing a waterproof reinforcing layer (20) of which both surfaces are coated with PE layers (22 and 23), stacking the waterproof reinforcing layer (20) on both surfaces of the urethane foam pad (10), laminating the PE layer (23) in contact with the urethane foam pad (10) and integrally forming the urethane foam pad (10) and the waterproof reinforcing layer (20), and performing a cutting operation according to a shape and a size of a roof panel.

The urethane foam pad (10) may be formed by foaming a polyol (A) and an isocyanate (B) at a high pressure and a mixing ratio (a weight ratio) of 100/110 (A/B), and reactivity of the foaming may have a cream time CT of 10 seconds, a rise time RT of 64 seconds and a demolding time of 10 minutes, and a density of the urethane foam pad (10) may be 50 to 100 kg/m$^3$.

The waterproof reinforcing layer (20) may be formed by coating with the PE layers (22 and 23) each having a weight of 25 to 35 g/m$^2$ on both surfaces of kraft paper (21) having a weight of 80 to 300 g/m$^2$.

The method may further include coating one (22) of the PE layers (22 and 23) with an adhesive 30 so that it can be attached to the roof panel. At this time, the adhesive (30) may be a hot melt adhesive having a density of 0.98 g/cc, a softening point of 140° C., a melting point of 160 to 200° C. and a viscosity of 16000 cps at 170° C.

According to another aspect of the present invention, there is provided a high stiffness waterproof roof panel pad for a vehicle, which is formed by the manufacturing method of the present invention, wherein a waterproof reinforcing layer (20) coated with PE layers (22 and 23) is stacked on both surfaces of a hard urethane foam pad (10), and the PE layer (23) in contact with the urethane foam pad (10) is laminated and thus the urethane foam pad (10) and the waterproof reinforcing layer (20) are formed integrally.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
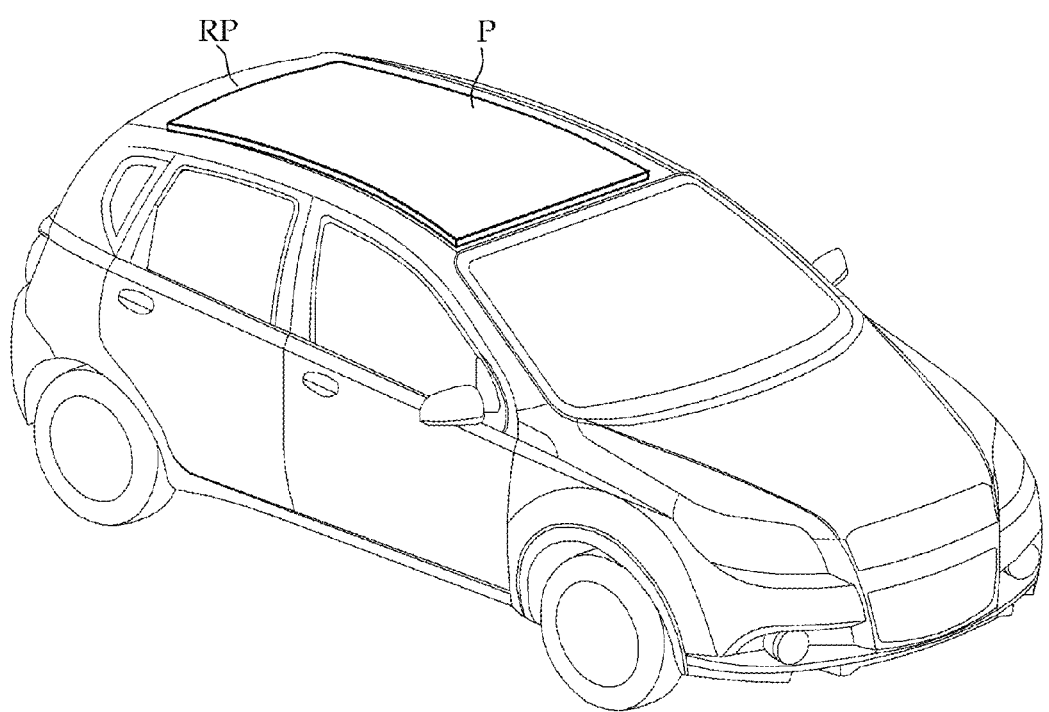
FIG. 1 is a perspective view schematically illustrating a position on which a roof panel pad is installed.
Figure 2:
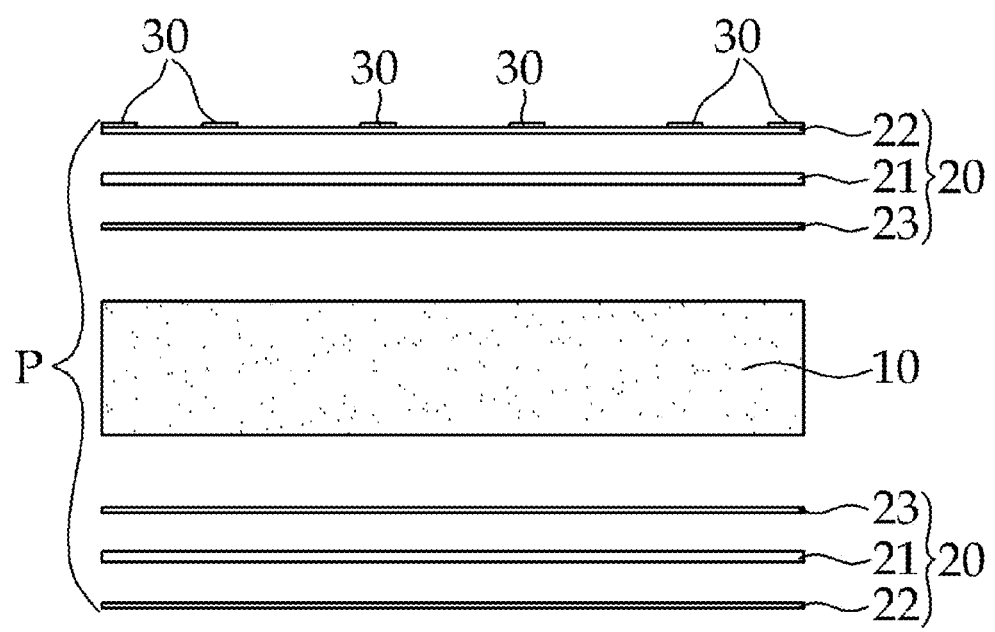
FIG. 2 is a cross-sectional view illustrating the roof panel pad which is divided in the order of stacking in order to explain a stacking structure thereof according to the present invention.

Exemplary embodiments of the present invention will be described in detail below with reference to the accompanying drawings. Prior to this, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustration only, and not intended to limit the scope of the invention, and so it should be understood that other equivalents and modifications could be made thereto without departing from the spirit and scope of the invention.

(Manufacturing Method)

As illustrated in FIGS. 1 to 3B, in a method of manufacturing a high stiffness waterproof roof panel pad P for a vehicle according to the present invention, a waterproof reinforcing layer 20 coated with PE layers 22 and 23 is laminated on both surfaces of a hard urethane foam pad 10, and thus the urethane foam pad and the waterproof reinforcing layer are formed integrally. The manufacturing method of the present invention is performed through the following four operations. Hereinafter, each of the four processes will be described.

A first operation S100 is an operation of preparing the hard urethane foam pad 10. The urethane foam pad 10 is for sound absorbing performance and stiffness reinforcement, which is formed of a hard urethane foam.

The hard urethane foam pad 10 is prepared by foaming a polyol A and an isocyanate B at a high pressure. At this time, a mixing ratio (a weight ratio) (A/B) is 100/110. In reactivity upon the foaming process, a cream time CT is 10 seconds, a rise time RT is 64 seconds and a demolding time is 10 minutes. A density of the urethane foam pad 10 formed as described above is 50 to 100 kg/m$^3$.

A second operation S200 is an operation of preparing the waterproof reinforcing layer 20. One pair of waterproof reinforcing layers 20 are prepared so that the waterproof reinforcing layers 20 may be stacked on both surfaces of the urethane foam pad 10. The waterproof reinforcing layers 20 are formed by coating both surfaces of kraft paper 21 with the PE layers 22 and 23, such that the urethane foam pad 10 may not be wet and the stiffness may also be reinforced.

Here, the kraft paper 21 is common paper manufactured with kraft pulp serving as a raw material. In the present invention, a weight of the kraft paper 21 is 80 to 300 g/m$^2$. And weights of the PE layers 22 and 23 are 25 to 35 g/m$^2$.

A third operation S300 is an operation of integrally forming the urethane foam pad 10 and the waterproof reinforcing layer 20. In a state in which the waterproof reinforcing layer 20 is stacked on both surfaces of the urethane foam pad 10, a general laminating process is performed so that the PE layer 23 of the waterproof reinforcing layer 20 which is in contact with the urethane foam pad 10 is fused and bonded integrally to the urethane foam pad 10. That is, the laminating process is performed on the PE layer 23 which is in contact with the urethane foam pad 10, and thus the urethane foam pad 10 and the waterproof reinforcing layer 20 are integrally formed using the PE layer 23 as an adhesive.

The roof panel pad P according to the present invention is substantially manufactured by the laminating process.

A fourth operation S400 is an operation of cutting the urethane foam pad 10 laminated with the waterproof reinforcing layer 20 in the third operation S300. Here, the cutting is performed according to a shape and a size of the roof panel. Since the shape and the size of the various types roof panels are generally changed according to a kind of the vehicle, the cutting process is performed in the shape and the size according to the kind of the vehicle.

Meanwhile, after the roof panel pad P is cut as described above, the embodiment of the present invention may include an operation of further coating a surface thereof with an adhesive 30. At this time, the adhesive 30 serves to adhere the roof panel pad P to a roof panel RP, as shown in FIG. 1.

Due to the adhesive 30, the roof panel pad P according to the present invention may be firmly adhered on the roof panel RP and may also be easily adhered thereon. Accordingly, a hot melt adhesive may be used in the present invention. At this time, the hot melt adhesive has a density of 0.98 g/cc, a softening point of 140° C., a melting point of 160 to 200° C. and a viscosity of 16000 cps at 170° C.

The PE layer 21 of the waterproof reinforcing layer 20 facing the roof panel RP is coated with the adhesive 30. An appropriate amount of adhesive 30 may be applied to a proper place in consideration of the shape and weight of the roof panel pad P, such that the roof panel pad P may not sagged from the roof panel RP, and firmly adheres to the roof panel RP.

The roof panel pad P coated with the adhesive 30 may be directly installed on the roof panel RP. However, when the roof panel pad P is not directly installed on the roof panel RP, a protective film (not shown) or the like is attached on the adhesive 30. Then, when installing the roof panel pad P, the protective film is removed, and the roof panel pad P is applied to the roof panel RP.

Figure 3A:
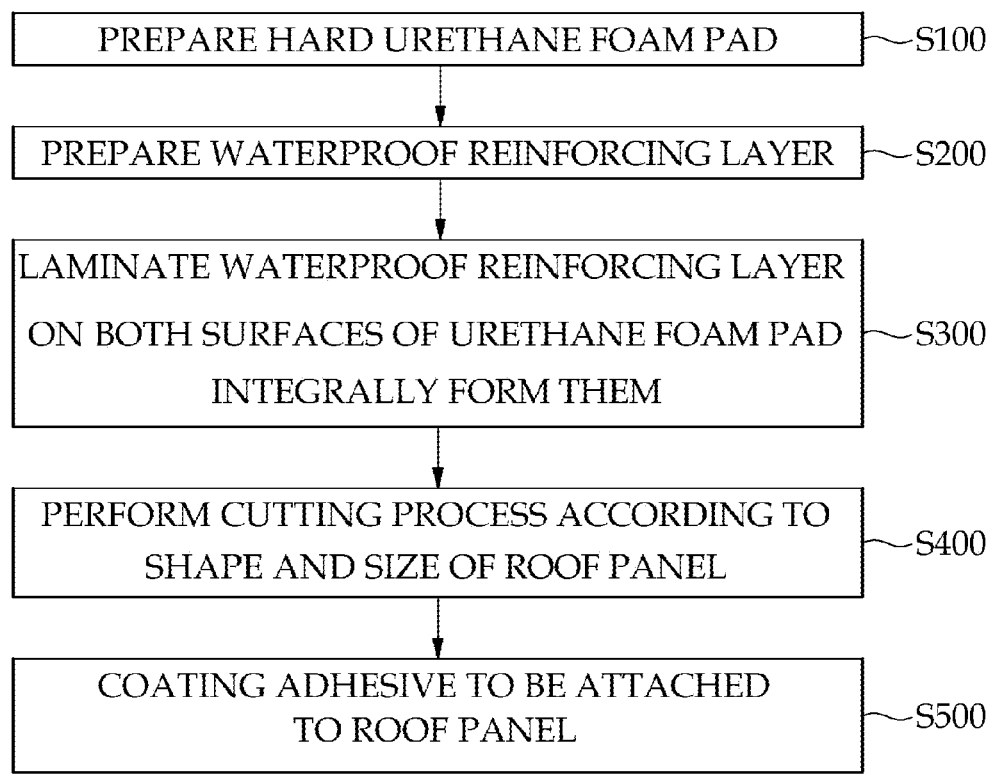
FIG. 3A is a flowchart illustrating a method of manufacturing the roof panel pad according to the present invention.
Figure 3B:
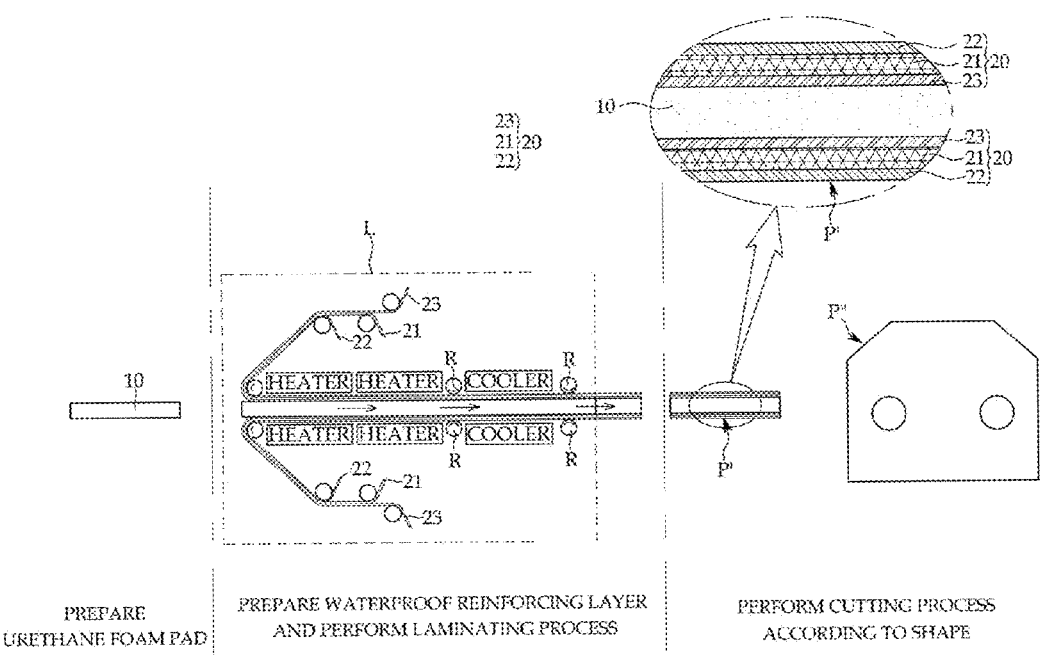
FIG. 3B is a process chart illustrating the method of manufacturing the roof panel pad according to the present invention.

FIG. 3B is a process chart illustrating the manufacturing method of the roof panel pad according to the present invention. FIG. 3B illustrates a state in which, when the prepared urethane foam pad 10 is supplied to a laminating apparatus L, construction elements of the waterproof reinforcing layer 20 are also supplied to the lamination apparatus L, and the waterproof reinforcing layer 20 is directly laminated on the urethane foam pad 10. In the drawing, a reference symbol P' designates a pad which is formed by laminating the waterproof reinforcing layer 20 but the adhesive 30 is not coated yet, and a reference symbol P''' designates a pad which is cut out according to the shape of the vehicle body roof.

(Roof Panel Pad)

The present invention includes the roof panel pad manufactured by the above-mentioned manufacturing method. The roof panel pad configured as described above according to the present invention may have a waterproof function in which moisture or the like introduced from a side of the roof panel may be removed by the waterproof reinforcing layer having the PE layer formed thereon and thus the urethane foam pad is prevented from becoming wet, and may obtain further improved sound absorbing performance, compared with the comparative example, as follows.

(Testing of Sound Absorbing Performance)

When the sound absorbing performance between the roof panel pad (the exemplary embodiment) configured as described above according to the present invention and the conventional pad (the comparative example) formed of the PET felt was compared, results thereof were as follows.

Figure 4:
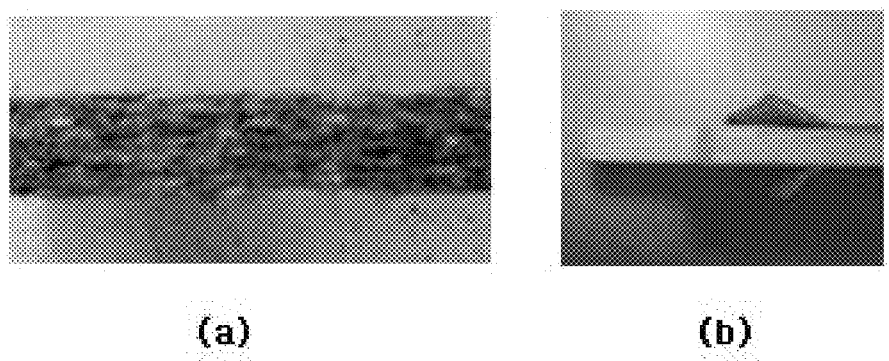
FIG. 4 is a photograph (a) of a comparative example of a pad formed of a PET felt and a photograph (b) of an embodiment thereof according to the present invention.

FIG. 4 shows a photograph (a) of the conventional comparative example formed of the PET felt, and FIG. 4 shows a photograph (b) of the exemplary embodiment of the present invention in which the waterproof reinforcing layers are laminated on both surfaces of the urethane foam pad. And the configurations and weights of the comparative example and the exemplary embodiment are indicated in the following Table 1.

TABLE 1

| Comparative example | | Exemplary embodiment | | |
|---|---|---|---|---|
| Configuration | Entire weight | Configuration | Weight according to configuration | Entire weight |
| PET felt | 300 g/m² | Waterproof reinforcing layer | PE layer | 30 g/m² | 900 g/m² |
| | | | Kraft paper | 200 g/m² | |
| | | Urethane foam pad | | 70 kg/m² | |

1) The configuration of the exemplary embodiment indicates the weight
2) The PE layers are formed on both surfaces of the kraft paper
3) Each of the thicknesses of the comparative example and the exemplary embodiment is 7t.

The noise had been measured in a state in which the comparative example and the exemplary embodiment performed as configured above were installed on a roof panel of a vehicle serving as a real vehicle, and the vehicle was moving at 100 km/hour. The results of the measuring are as follows.

Figure 5:
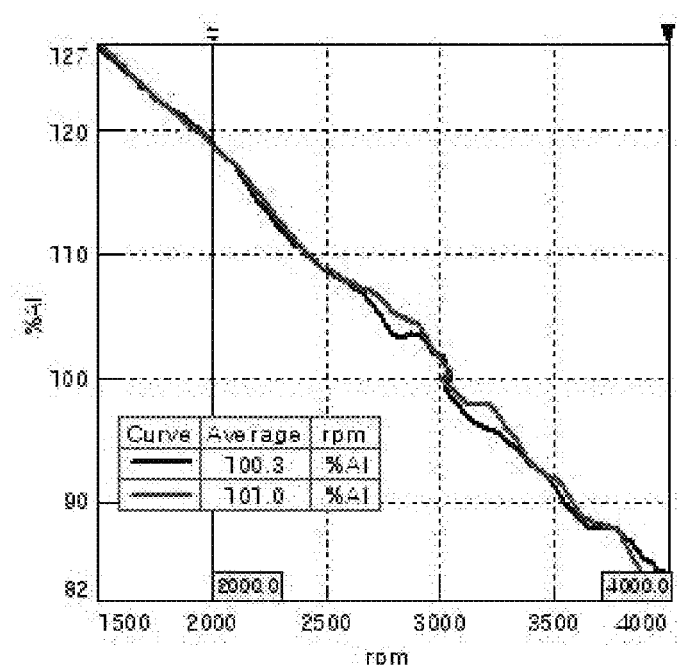
FIG. 5 is a comparative graph illustrating noise absorbing performances of the comparative example and the embodiment, which are detected at a driver seat.
Figure 6:
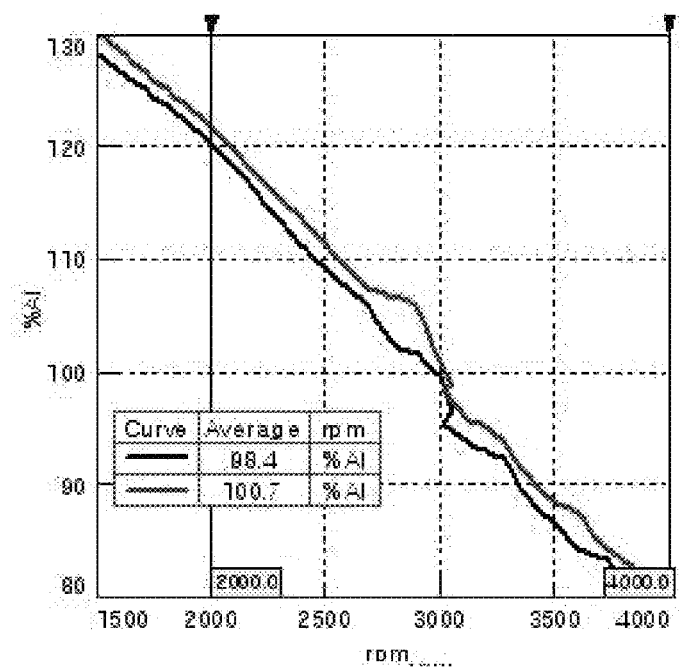
FIG. 6 is a comparative graph illustrating noise absorbing performances of the comparative example and the embodiment, which are detected at a back seat.

FIGS. 5 and 6 are graphs respectively illustrating the noise measured at a driver seat and a back seat of a real vehicle. In the graphs, red lines indicate the noise absorbing performance of the exemplary embodiment according to the number of revolutions of an engine, and black lines indicated the noise absorbing performance of the comparative example according the number of revolutions of the engine.

As shown in the drawings, it can be understood that the noise absorbing performances at the driver seat and the back seat in the exemplary embodiment were more improved than those in the comparative example. Particularly, it can be confirmed that, in the case of the driver seat, it was possible to obtain an improved effect of 0.7%, as shown in FIG. 5, and in the case of the back seat, it was possible to obtain an improved effect of 1.7%, as shown in FIG. 6.

Accordingly, the roof panel pad according to the present invention may obtain the improved effects at both of the driver seat and the back seat, and particularly, it can be understood that the noise absorbing effect is further increased by the stiffness reinforcing effect at the rear seat having weak panel stiffness.

According to the high stiffness waterproof roof panel pad for the vehicle according to the present invention and the manufacturing method thereof, it is possible to obtain the following effects:

(1) Since the pad is manufactured by laminating the waterproof reinforcing layer coated with the PE layer on both surfaces of the base material which is the urethane foam, it is possible to simultaneously obtain the sound absorbing effect and the vehicle body stiffness reinforcing effect, and thus to suppress vibration of the vehicle body.

(2) Even when the dew condensation occurs at the vehicle body panel, the waterproof reinforcing layer absorbs the moisture, and thus the roof panel pad may be prevented from becoming wet.

(3) Particularly, due to the prevention of the wetting, the sound absorbing ability of the roof panel pad may be prevented from being deteriorated, and also the dew condensation is prevented from occurring at the inside of the vehicle.

(4) As described above, since the roof panel pad is prevented from becoming wet due to the dew condensation, the roof panel pad may be prevented from peeling off the roof panel, and thus a life span of the roof panel may be extended.

(5) Since the roof panel pad according to the present invention may be attached to the vehicle body panel using the hot melt adhesive, it is possible to easily and firmly attach the roof panel pad.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of manufacturing a high stiffness waterproof roof panel pad for a vehicle, comprising:
   preparing a hard urethane foam pad;
   preparing a waterproof reinforcing layer of which both surfaces are coated with PE layers;
   stacking the waterproof reinforcing layer on both surfaces of the urethane foam pad, laminating the PE layer in contact with the urethane foam pad and integrally forming the urethane foam pad and the waterproof reinforcing layer; and
   performing a cutting operation according to a shape and a size of a roof panel,
   wherein the urethane foam pad is formed by foaming a polyol and an isocyanate at a high pressure and a mixing ratio of 100/110 polyol to isocyanate, and reactivity of the foaming has a cream time CT of 10 seconds, a rise time RT of 64 seconds and a demolding time of 10 minutes, and a density of the urethane foam pad is 50 to 100 kg/m³.

* * * * *